United States Patent
Rolla

[19]

[11] Patent Number: 6,161,469
[45] Date of Patent: Dec. 19, 2000

[54] ESPRESSO MACHINE

[76] Inventor: Alberto Rolla, Via Lucca 2/13, I-16146 Genoa, Italy

[21] Appl. No.: 09/448,431

[22] Filed: Nov. 24, 1999

[30] Foreign Application Priority Data

Nov. 24, 1998 [IT] Italy .................................. GR98A0007

[51] Int. Cl.[7] ..................................................... A47J 31/00
[52] U.S. Cl. ............................. 99/293; 99/302 R; 99/307
[58] Field of Search ......................... 99/293, 294, 323.1, 99/302 R, 307

[56] References Cited

U.S. PATENT DOCUMENTS

| | | | |
|---|---|---|---|
| 3,031,947 | 5/1962 | Heuckeroth | 99/294 X |
| 4,137,833 | 2/1979 | Yelloz | 99/293 |
| 5,357,848 | 10/1994 | Eugster et al. | 99/293 X |
| 5,842,407 | 12/1998 | Schmed | 99/293 X |

*Primary Examiner*—Reginald L. Alexander
*Attorney, Agent, or Firm*—James Creighton Wray; Meera P. Narasimhan

[57] ABSTRACT

The invention relates to an espresso machine, wherein water in the boiler (1) is superheated and kept at a temperature above 100° C. for producing steam to be supplied to a dispenser nozzle (10), which superheated water is mixed with cold water at a mixing station (12), to obtain hot water having a temperature below 100° C., supplied to the coffee brewing unit (13) and to the dispenser nozzle (10). According to the invention, the coffee brewing unit (13) is attached to the lower side of the boiler (1) and is connected to the mixing station (12) by means of a feed pipe (14), which is at least partly housed in the boiler (1). In the pipe (4) for feeding cold water to the boiler (1), a non return valve (16) is provided, which opens in the direction of flow into the boiler and is situated downstream from the branch point of the pipe (11) for feeding cold water to the mixing station (12).

9 Claims, 2 Drawing Sheets

ESPRESSO MACHINE

BACKGROUND OF THE INVENTION

The invention relates to espresso machines having a boiler and at least one coffee brewing unit, as well as at least one hot water and/or steam dispenser nozzle, in which machines boiler water is superheated and kept at a temperature (above 100° C.) for producing steam to be supplied to the dispenser nozzle, and which superheated water is mixed with cold water at a mixing station preferably provided in the upper part of the boiler, to obtain hot water having a lower temperature (below 100° C.), to be supplied to the coffee brewing unit and to the dispenser nozzle, a pump being provided to draw cold water from a tank and to transfer it to the boiler through a first feed pipe, branching from the pump delivery pipe, and—through a second feed pipe branching from the pump delivery pipe—to said mixing station, which communicates with the upper part of the boiler through a steam or superheated water drawing pipe, with the dispenser nozzle through a delivery pipe, and with the at least one coffee brewing unit.

In such espresso machines, both the steam supplied to the dispenser nozzle and the hot water supplied to the dispenser nozzle and to the coffee brewing unit are immediately available, with no idle time, and the espresso machine is always ready for any operating condition.

SUMMARY OF THE INVENTION

The present invention relates to some improvements to espresso machines as described hereinbefore and aims at making these machines simpler as regards construction and functionally safer and versatile, by reducing their size and widening their application range.

According to a first improvement, the invention provides an espresso machine as described hereinbefore, particularly intended for home use, wherein the at least one coffee brewing unit is disposed under the boiler and is preferably attached to the lower side thereof, whereas the mixing station is connected to the coffee brewing unit through a feed pipe which extends at least partly inside the boiler.

According to an embodiment of this improved espresso machine, the mixing station is outside the boiler, and over it, and the pipe for drawing superheated water and steam from the boiler branches upwards from the upper part of the boiler, while the upper open end of the feed pipe, extending inside the boiler, and connected to the coffee brewing unit fits therein from below.

According to a further embodiment of the above improved espresso machine, the mixing station is provided inside the boiler, in the upper part thereof, and consists of the pipe fitting connecting the cold water feed pipe and the pipe for delivery to the dispenser nozzle, as well as the feed pipe accommodated inside the boiler and connected to the coffee brewing unit, which pipe fitting communicates with the upper part of the boiler through at least one opening or at least one pipe, for drawing steam and superheated water therefrom. This embodiment has the advantage to further reduce the number of external pipes, and so the machine size.

A further reduction of the external pipes, resulting in a smaller size of the machine, may be obtained thanks to the invention by providing that at least one part of the pipe for feeding cold water to the boiler and/or at least one part of the pipe for feeding cold water to the mixing station are housed in the boiler, preferably with calibrated throats, or the like, inserted in said pipes. Further improvements of the invention relate to all above espresso machines, i.e. both to general machines, as described hereinbefore and to the above improved machines, particularly both to machines in which the at least one coffee brewing unit is substantially separated from the boiler and is connected to the mixing station by means of a delivery pipe which is parallel to or branching from the delivery pipe connected to the dispenser nozzle, and to machines in which the at least one coffee brewing unit is disposed under the boiler and is preferably attached to the lower side thereof, and the mixing station is connected to the coffee brewing unit by means of a feed pipe at least partly extending inside the boiler. In both espresso machine types, it may happen that when steam is drawn by the pipe for delivery to the dispenser nozzle, a small pressure drop is determined between the inner part of the boiler and the mixing station. Due to this pressure drop, water contained in the boiler may flow through the pipe for feeding cold water to the boiler and through the attached pipe for feeding cold water to the mixing station and may get to the mixing station, where it is carried by the outcoming steam flow in the form of small drops. These water drops affect the quality of steam dispensed by the dispenser nozzle and cause the beverage heated by said steam to be undesirably watered.

This drawback is obviated thanks to the invention in a simple and effective manner, by providing, in the pipe for feeding cold water to the boiler, a non return valve, downstream from the branch point of the pipe for feeding cold water to the mixing station, which opens in the direction of flow into the boiler.

Another drawback shared by both espresso machine types consists in that, when an excessive amount of steam is drawn from the boiler, i.e. for a long time, the level of superheated water lowers to such an extent that, on further hot water demand, e.g. for a coffee brewing operation, water is dispensed at a lower temperature than desired, due to the fact that the cold water quickly and abundantly supplied to the boiler to restore the fill-up level, temporarily lowers the average water temperature of boiler water. A solution to this drawback is known, which consists in operating the pump for supplying cold water to the boiler intermittently and for short periods, upon steam dispensing, so that cold water can be supplied to the boiler in a constant and gradual manner, to compensate for consumption. Yet, this intermittent supply of cold water to the boiler automatically causes a corresponding simultaneous cold water supply to the mixing station, whereby steam coming out of the mixing station carries small drops of the simultaneously supplied cold water with it, thereby getting colder and watered.

This drawback is obviated thanks to the invention by providing—in combination with an intermittent supply of cold water to the boiler upon steam dispensing—the mixing station inside a mixing chamber, which forms an upper extension of the boiler and wherein the cold water feed pipe an the delivery pipe connected to the dispenser nozzle open from above, at separate and suitably spaced locations, so that, when coffee has to be brewed or hot water has to be dispensed, the superheated water drawn from the boiler carries the cold water coming out of its respective feed pipe with it, mixing with it and thereby reducing its temperature, whereas, when steam has to be dispensed, with the cold water feed pump operating intermittently, the steam coming out of the pipe for delivery to the dispenser nozzle has not a sufficient speed to carry the cold water entering trough its respective feed duct in the pump operation periods.

These and other improvements, characteristics and advantages of the present invention will appear in greater detail from the following description of a few embodiments, shown very schematically and by way of non-limiting examples in the accompanying drawings, in which:

DETAILED DESCRIPTION

Figure 1:
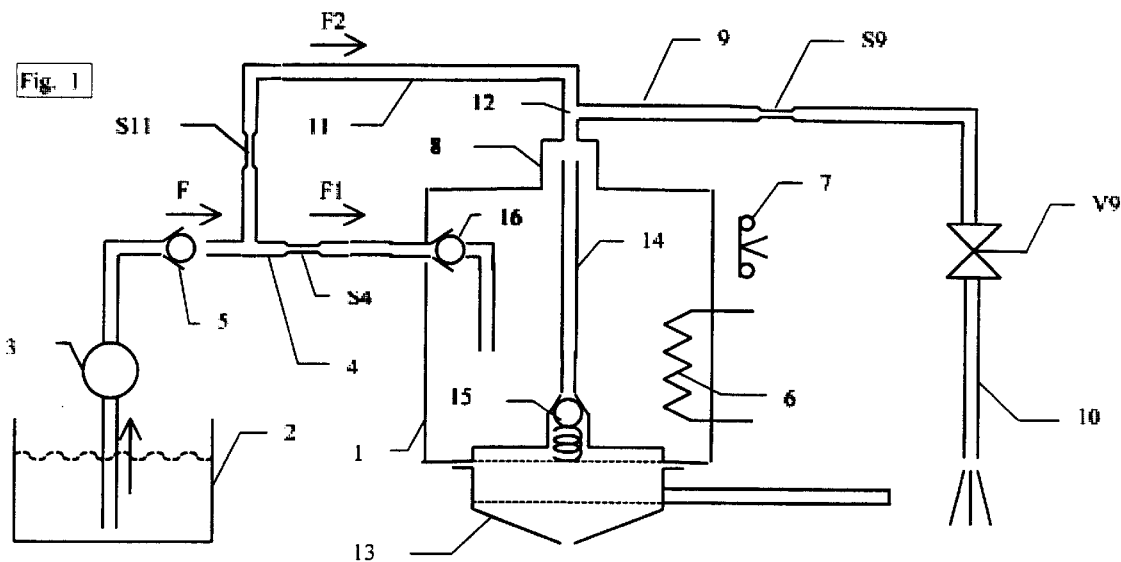
FIG. 1 shows the diagram of a home espresso machine according to the invention.

In FIG. 1, numeral 1 denotes the boiler of an espresso machine. The boiler 1 is supplied with cold water from a tank 2 by means of a pump 3 and of a feed pipe 4. A nonreturn valve 5 (typically integrated in the pump 3) and, at a certain distance downstream from the valve, a calibrated throat S4 are provided in the cold water feed pipe 4, downstream from the pump 3.

Water in the boiler 1 is heated by means of an electrical resistor 6, with the help of a thermostatic switch. A pipe 8 for drawing steam and superheated water from the boiler 1 branches upwards and preferably at the center of the boiler 1. This drawing pipe 8 is connected to at least one steam and hot water dispensing nozzle 10, through a delivery pipe 9 and an on-off valve V9. A calibrated throat S9 may be provided in the delivery pipe 9.

A feed pipe 11, having a calibrated throat S11 branches from a point of the pipe 4 for supplying hot water to the boiler 1, situated between the nonreturn valve 5 and the throat S4, and opens into a mixing station 12 in the delivery pipe 9 connected to the dispenser nozzle 10. The mixing station 12 is situated over the drawing pipe 8 communicating with the inner part of the boiler 1, and is directly connected to said pipe 8.

The coffee brewing unit 13, which is shown schematically, is provided under the boiler 1 and is attached to the lower side thereof. This coffee brewing unit 13 is connected to the mixing station 12 through a hot water feed pipe 14, which is housed in the boiler 1 and opens, by its open upper end, into the drawing duct 8 next to the mixing station 12. In the illustrated embodiment, the feed pipe 14 consists of a central riser pipe, coaxial to the drawing pipe 8, whose upper end, which fits and terminates into the drawing pipe 8, has an outside diameter which is smaller than the inside diameter of the drawing pipe 8, so that an annular opening for communication between the drawing pipe 8 and the boiler 1 is provided.

The feed pipe 14 is connected to the coffee brewing unit 13 by means of a calibrated valve 15 which automatically opens in the flow direction towards the coffee brewing unit 13.

A nonreturn valve 16 which opens in the direction of cold water supplied to the boiler 1 is provided in the pipe 4 for supplying cold water to the boiler 1, at an area upstream or downstream from the calibrated throat S4, but always downstream from the branch point of the feed pipe 11 connected to the mixing station 12.

Water in the boiler 1 is superheated and kept—thanks to the resistor 6 and to the thermostatic switch—at a steam producing temperature, i.e. at a temperature above 100° C., and for instance at a temperature of 120° C. So, the valve V9 shall simply be opened to have steam dispensed through the dispenser nozzle 10, while the pump 3 is kept idle or is intermittently operated for short periods. Water in the boiler 1 starts boiling immediately due to the pressure being lowered after opening the valve V9 and immediately supplies steam to the dispenser nozzle 10 through the drawing pipe 8, the mixing station 12 and the delivery pipe 9. Yet, the throat S9 in the delivery pipe 9 limits steam emission so that pressure in the boiler 1 is kept above atmospheric pressure. As a result, water in the boiler 1 boils at a temperature above 100° C., preferably at a temperature as close as possible to 120° C., whereby superheated steam is dispensed, which is perfectly dry. The nonreturn valve 5 prevents water from returning towards the tank 2 when the pump 3 stops.

Said steam dispensing causes a small pressure reduction at the mixing station 12 as compared with the pressure in the boiler 1. However, the nonreturn valve prevents superheated water from flowing out of the boiler 1 through the feed pipe 4 and from getting to the mixing station 12 through the pipe 11 branching therefrom. So the problem of water drops being carried by steam coming out of the mixing station 12 through the delivery pipe 9 is obviated.

Hot water supplied to the coffee brewing unit 13, or dispensed through the dispenser nozzle 10, must anyway have a temperature below 100° C., e.g. a temperature of the order of 90° C. In order to brew coffee or dispense hot water through the dispenser nozzle 10, the pump 3 is operated, for delivering a cold water flow F to pipes 4 and 11. The two calibrated throats S4 and S11 are so dimensioned as to divide the incoming cold water flow F into a partial flow F1, corresponding to a greater fraction, e.g. to about 70% of the incoming flow F, which is fed to the boiler 1 through the throat S4, the feed pipe 4 and the nonreturn valve 16, and a partial flow F2, corresponding to a smaller fraction, e.g. to about 30% of the incoming flow F, which is fed to the branch feed pipe 11, passing through the throat S11. Superheated water in the boiler 1 gets to the mixing station 12 through the drawing pipe 8, in which mixing station 12 a flow of this superheated water, corresponding to the flow F1 fed to the boiler 1, mixes with the partial flow F2 of cold water fed to said mixing station 12, through the feed pipe 11 and through the calibrated throat S11. This mixture of a part of cold water (e.g. corresponding to 30%) coming from the pump 3 and having, for instance, a temperature of 20° C., and of a part of superheated water (e.g. corresponding to 70%) coming from the boiler 1 and having, for instance, a temperature of about 120° C., creates hot water having a temperature which is substantially lower than that of superheated water contained in the boiler 1, e.g. a temperature of about 90° C., and this hot water is fed from the mixing station 12, through the feed pipe 14 inside the boiler 1 and its automatic valve 15, to the coffee brewing unit 13 and/or to the dispenser nozzle 10, through the delivery pipe 9, and through the open valve V9.

The throat S9 downstream from the mixing station 12 of the delivery pipe 9 is so dimensioned that hot water dispensed through the dispenser nozzle 10 is limited to such an amount as to allow the pump 3 to keep a pressure in the boiler 1, which is higher than the boiling pressure of water at the desired temperature. Hence, for instance, if water in the boiler 1 has a temperature of about 120° C., said overpressure in the boiler 1 must be at least 1 kg/cm2 higher than the outside atmospheric pressure. Without said overpressure, steam bubbles would be formed, which would alter the desired mixture ratio, and hence the final temperature of the dispensed hot water.

Figure 2:
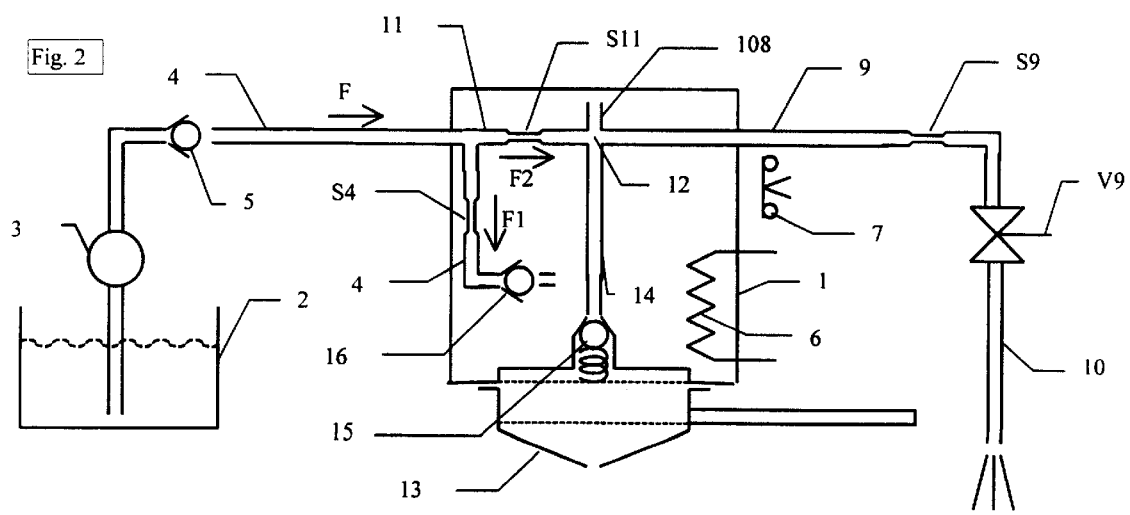
FIG. 2 shows the diagram of another home espresso machine according to the invention.

The embodiment of the home espresso machine as shown in FIG. 2 is substantially identical to the one described above and shown in FIG. 1, equal parts being denoted by the same reference numerals. Yet, unlike the embodiment as shown in FIG. 1, in the machine as shown in FIG. 2 the mixing station 12 is inside the boiler, preferably in the upper part thereof. To this end, the cold water feed pipe 11 penetrates the boiler 1 in a water-tight manner, e.g. upstream from its calibrated throat S11 (so the latter is also housed in the boiler 1) and is connected to the mixing station 12, wherefrom the riser pipe 14 for feeding hot water to the coffee brewing unit 13 and the pipe 9 for delivering steam and hot water to its dispenser nozzle 10 branch. The mixing station 12, consisting of the pipe fitting, e.g. a tee, between the two pipes 9, 11 and the pipe 14, also communicates with the upper inner part of the boiler 1 through at least one opening (not shown) or through a steam and superheated water drawing pipe 108. This drawing pipe 108 is preferably directed from the mixing station 12 upwards.

In the embodiment as shown in FIG. 2, an end portion of the pipe 4 for supplying cold water to the boiler 1 is also housed in the boiler 1, e.g. from a location upstream from the branch point of the feed pipe 11 connected to the mixing station 12, including therein its calibrated throat S4 and the nonreturn valve 16.

Figure 3:
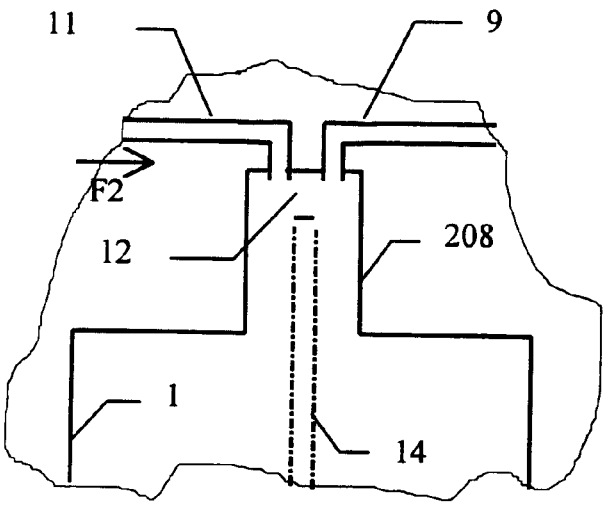
FIG. 3 shows the upper part of the boiler of another embodiment of the espresso machine according to the invention.

The embodiment as shown in FIG. 3 relates both to home espresso machines as shown in FIGS. 1 and 2 and to espresso machines, wherein coffee brewing units are not situated on the lower side of the boiler 1, but are separated and possibly disposed at a certain distance therefrom. In accordance with this embodiment of the invention, the station 12 for mixing the cold water supplied by the pump and the superheated water coming from the boiler 1 is provided inside a mixing chamber 208, which may form an upper extension of the boiler and replace the steam and superheated water drawing pipes 8 or 108, provided in the embodiments as shown in FIGS. 1 and 2. The duct 11 for feeding cold water to the mixing station 12, and the duct 9 for delivering steam or hot water to the dispenser nozzle (not shown), open into the mixing chamber 208 preferably from above and at spaced locations. When the coffee brewing unit (not shown) is attached to the lower side of the boiler 1, as in the embodiments of FIGS. 1 and 2, then said unit can be connected to the mixing chamber 208 through the feed pipe 14 inside the boiler and made, for example, in the form of a riser pipe, as previously described with reference to FIGS. 1 and 2 and outlined by dashed and dotted lines in FIG. 3, which feed pipe 14 fits into the mixing chamber 208 from below and opens therein. However, when the coffee brewing unit/s are separated from the boiler 1 and possibly disposed at a certain distance therefrom, then they are connected to the mixing chamber 208 through a feed pipe (not shown) branching from the pipe 9 for delivery to the dispenser nozzle.

In the embodiment as shown in FIG. 3, the mixing chamber 208 and the openings of pipes 11 and 9 therein are conformed and dimensioned in such a way as to obtain the following operation:

When hot water is to be dispensed to the coffee brewing unit/s or to the dispenser nozzle, the superheated water flow coming from the boiler 1 and entering the mixing chamber 208, mixes with the cold water flow F2 which, though coming down from the feed duct 11, is carried by said superheated water flow, mixing therewith, towards the upper inlet end of the feed pipe 14 or towards the entrance of the delivery pipe 9. However, if steam is to be dispensed, the cold water feed pump 3 is operated preferably intermittently, i.e. by pulses, and the steam which is formed and collected in the mixing chamber 208 and flows towards the entrance of the delivery pipe 9, has a speed which is insufficient to carry with it the cold water coming down from its feed duct 11, whereby this water falls into the boiler 1 by gravity. Hence, cold water supplied by the pump 3 in the periods of intermittent operation thereof, both directly to the boiler 1 through the feed pipe 4 and unavoidably also to the mixing chamber 208, through the feed pipe 11, is completely fed to the boiler 1, and is thus prevented from being partly carried by the outcoming steam, and from cooling and watering it.

By using the embodiment as shown in FIG. 3, the non-return valve 16, provided in the embodiments of FIGS. 1 and 2 in the pipe 4 for feeding cold water to the boiler 1 may be omitted.

Espresso machines, and particularly machines wherein coffee brewing units are not in heat conducting contact with the boiler, whereby they are not kept at a certain temperature by the boiler, have the drawback that the coffee brewing unit and the coffee blend contained therein are cold when the machine is started, and absorb a certain amount of heat from hot water supplied thereto, which considerably lowers the temperature of the first coffee to be dispensed. Therefore, coffee, particularly strong coffee has an undesirably low temperature at the beginning. The same drawback is noted after long inactivity periods of the espresso machine, during which coffee brewing units are even considerably cooled.

Figure 4:
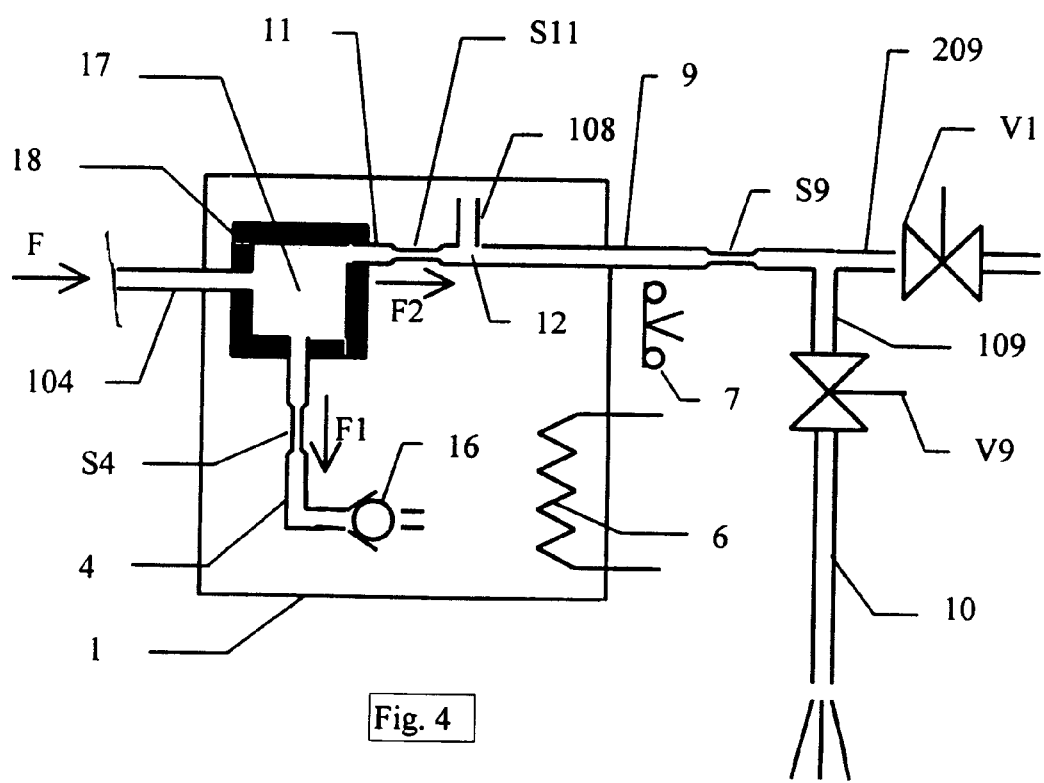
FIG. 4 is a partial view of a variant embodiment of the espresso machine according to the invention.

Said drawback is obviated thanks to the invention by the embodiment as shown in FIG. 4, wherein the delivery pipe 9, branching from the mixing station 12 is connected to the steam and hot water dispensing nozzle, downstream from any calibrated throat S9, through a branch pipe 109 and through the on-off valve V9, and to one or more coffee brewing units (not shown), more or less distant from the boiler 1 or anyway unable to receive heat directly from the boiler, through another branch pipe 209 and another on-off valve V19. The delivery pipe 104 of the pump is connected to a pre-heating chamber 17 which is housed in the boiler 1 and is provided with a thermal insulator 18. This pre-heating chamber 17 is connected to the mixing chamber 12 through the feed pipe 11 and its calibrated throat S11. Also, the preheating chamber 17 is connected to the inner part of the boiler 1 through the feed pipe 4 with its calibrated throat S4 and nonreturn valve 16. In the illustrated embodiment, the feed pipe 4 (with its throat S4 and nonreturn valve 16), as well as the mixing station 12, and the feed pipe 11 (with its throat S11) are housed in the boiler 1. The mixing station 12 communicates with the upper inner part of the boiler through the riser pipe 108 for drawing steam and superheated water, as described for the embodiment of FIG. 2. Yet, the mixing station 12 may be also obviously provided outside the boiler 1, e.g. over it, as in the embodiment of FIG. 1, or the mixing chamber 208 of the embodiment of FIG. 3 may be also used. The preheating chamber 17 may be housed only partly in the boiler 1 or may be connected thereto in another heat conducting manner. The chamber 17 inside the boiler 1 might even supply the pipe 11 only (upstream or downstream from the throat S11), branching the pipe 4 upstream from it, directly from the pipe 104.

In this embodiment, the capacity of the preheating chamber 17 and its ability to absorb heat from water contained in the boiler 1 are selected in such a manner, e.g. by properly dimensioning the insulator 18 of the preheating chamber 17, as to obtain the following operation: During the idle period preceding any new start of the espresso machine, for instance in the morning, when coffee brewing unit/s are still cold, as well as during longer inactivity periods, in which no coffee is brewed, and the coffee brewing unit/s get notably colder, the water contained in the preheating chamber 17 is heated by the water in the boiler 1 to a temperature which is higher than that of the cold water supplied by the pump. Hence, when coffee is first brewed, hot water supplied to the coffee brewing unit, has a higher temperature than normal, since it results from mixture, at station 12, of superheated water from the boiler and cold water preheated in the chamber 17 to a temperature higher than normal cold water. This higher temperature of hot water used for the first brewing operation/s compensates for the loss of heat required to heat the coffee brewing unit/s at the beginning. When the espresso machine is further used, cold water fed to the mixing station 12 through the preheating chamber 17 remains in this chamber for a period of a certain length, substantially corresponding to the idle periods between the individual coffee brewing operations, and hence corresponding to the different cooling levels of the coffee brewing unit/s, whereby said cold water is automatically preheated to a temperature which substantially corresponds to the cooling level of the coffee brewing unit/s and hence capable to exactly compensate for this cooling effect. In this manner, the coffee brewing unit/s are automatically kept at a substantially constant operating temperature, and the coffee brewed always has substantially the same temperature, regardless of the amount of brewed coffee and of the idle interval between two successive brewing operations.

Obviously, the invention is not limited to the embodiments described and illustrated herein, but may be greatly varied, especially as regards construction, and in the range of construction and function equivalents. So, for example, the calibrated throats S4, S9, S11 may be provided in such a manner as to allow variation and adjustment of their section and may be replaced by adjustable flow control valves. The valves V9, V19 may be operated manually or consist of solenoids. All the characteristics described, illustrated and claimed according to the invention are intended to be protected both individually and in any combination of two or more of them, as well as in their application to espresso machines whose remaining parts are made in any manner. All this without departure from the guiding principle disclosed above and claimed below.

What is claimed is:

1. An espresso machine having a boiler (1) and at least one coffee brewing unit, as well as at least one hot water and/or steam dispenser nozzle (10), in which machine water in the boiler (1) is superheated and kept at a temperature (above 100° C.) for producing steam to be supplied to the dispenser nozzle (10), and which superheated water is mixed with cold water at a mixing station (12) preferably provided in the upper part of the boiler, to obtain hot water having a lower temperature (below 100° C.), to be supplied to the coffee brewing unit (13) and to the dispenser nozzle (10), a pump (3) being provided to draw cold water from a tank (2) and to transfer it to the boiler (1) through a first feed pipe (4), branching from the pump delivery pipe, and—through a second feed pipe (11) branching from the pump delivery pipe—to said mixing station (12), which communicates with the upper part of the boiler (1) through a steam or superheated water drawing pipe (8), with the dispenser nozzle (10) through a delivery pipe (9), and with said at least one coffee brewing unit (13), characterized in that, particularly for home machines, the at least one coffee brewing unit (13) is disposed under the boiler (1) and is preferably attached to the lower side thereof, whereas the mixing station (12) is connected to the coffee brewing unit (13) through a feed pipe (14) which extends at least partly inside the boiler (1).

2. A machine as claimed in claim 1, characterized in that the mixing station (12) is outside the boiler (1), and over it, whereas the pipe (8) for drawing steam and superheated water (1) from the boiler (1) branches upwards from the upper part of the boiler (1), while the upper open end of the feed pipe (14), provided inside the boiler (1), and connected to the coffee brewing unit (13) fits therein from below.

3. A machine as claimed in claim 1, characterized in that the upper end of the feed pipe (14), which fits from below into the drawing pipe (8), has an outside diameter which is considerably smaller than the inside diameter of the drawing pipe (8).

4. A machine as claimed in claim 1, characterized in that the mixing station (12) is situated inside the boiler (1), preferably in the upper part thereof, and consists of the pipe fitting connecting the pipe (11) for feeding cold water to the mixing station (12) and the pipe (9) for delivering steam and hot water to the dispenser nozzle (10), as well as the feed pipe (14) housed in the boiler (1) and connected to the coffee brewing unit (13), which pipe fitting communicates with the upper inner part of the boiler (1) through at least one opening or at least one pipe (108) for drawing steam and superheated water therefrom.

5. A machine as claimed in claim 1 characterized in that the feed pipe connected to the coffee brewing unit (13) and accommodated inside the boiler (1) consists of a riser feed pipe (14).

6. A machine as claimed in claim 1, characterized in that at least one part of the pipe (4) for feeding cold water to the boiler (1) and/or at least one part of the pipe (11) for feeding cold water to the mixing station (12) are housed in the boiler (1), preferably with calibrated throats (S4, S11), or the like, inserted in said pipes (4, 11).

7. An espresso machine as claimed in claim 1, characterized in that in the pipe (4) for feeding cold water to the boiler (1), a non return valve (16) is provided, which opens in the direction of water flow into the boiler (1) and is situated downstream from the branch point of the pipe (11) for feeding cold water to the mixing station (12).

8. A machine as claimed in claim 1 wherein, upon steam dispensing by the dispenser nozzle, the pump (3) intermittently supplies cold water to the boiler (1), characterized in that the mixing station (12) is situated inside a mixing chamber (208), which may form an upper extension of the boiler (1) and wherein the cold water feed pipe (11) an the delivery pipe (9) connected to the dispenser nozzle open from above, at separate and suitably spaced locations, so that, when coffee has to be brewed or hot water has to be dispensed, the superheated water drawn from the boiler (1) carries the cold water coming out of its feed pipe (11) with it, mixing with it and thereby reducing its temperature, whereas, when steam has to be dispensed, the steam coming out of the pipe (9) for feeding the dispenser nozzle has not a sufficient speed to carry the cold water entering trough its respective feed duct (11) in the operation periods of the pump (3).

9. A machine as claimed in claim 1 wherein the coffee brewing unit/s are not in heat conducting contact with the boiler and are, for instance, separated and at a certain distance therefrom, whereas they are connected to their respective dispenser nozzle through a duct (209) for feeding hot water branching from the steam and hot water delivery pipe (9, 109) characterized in that, in the duct (11) for feeding cold water to the mixing station (12), a preheating chamber (17) is provided which is at least partly housed in the boiler (1) or is otherwise in heat conducting connection with the water contained in the boiler (1), and that heat absorption by the preheating chamber (17) is controlled in such a way, e.g. through a proper thermal insulator, that cold water is preheated in said chamber (17) to an extent corresponding to the length of the machine idle period between two successive coffee brewing operations, hence to an extent corresponding to the relevant cooling level of the coffee brewing unit/s.

* * * * *